US 6,650,028 B1

(12) United States Patent
Cornelius

(10) Patent No.: US 6,650,028 B1
(45) Date of Patent: Nov. 18, 2003

(54) DUAL ISOLATED INPUT POWER SUPPLY

(75) Inventor: Gurley D. Cornelius, Toney, AL (US)

(73) Assignee: Verilink, Inc., Madison, AL (US)

( * ) Notice: Subject to any disclaimer, the term of this patent is extended or adjusted under 35 U.S.C. 154(b) by 109 days.

(21) Appl. No.: 09/995,273

(22) Filed: Nov. 27, 2001

(51) Int. Cl.$^7$ ................................................. H02J 1/00
(52) U.S. Cl. ............................ 307/87; 307/80; 307/43
(58) Field of Search ............................ 307/44, 83, 80, 307/87, 43

(56) References Cited

U.S. PATENT DOCUMENTS

| | | | | |
|---|---|---|---|---|
| 4,038,559 A | * | 7/1977 | Chun et al. .................... | 307/64 |
| 4,481,564 A | * | 11/1984 | Balaban ........................ | 363/19 |
| 4,864,481 A | * | 9/1989 | Osman ..................... | 363/21.17 |
| 5,483,463 A | * | 1/1996 | Qin et al. .................... | 700/297 |
| 5,631,504 A | | 5/1997 | Adahan | |
| 5,640,312 A | | 6/1997 | Carroll | |
| 5,670,833 A | * | 9/1997 | Mengelt et al. ............... | 307/66 |
| 5,751,564 A | | 5/1998 | Dien | |
| 5,852,550 A | * | 12/1998 | Majid et al. .............. | 363/21.05 |
| 5,852,555 A | | 12/1998 | Martin | |
| 5,862,041 A | | 1/1999 | Martin | |
| 5,920,129 A | | 7/1999 | Smith | |
| 5,994,793 A | | 11/1999 | Bobry | |
| 6,111,762 A | * | 8/2000 | Igarashi et al. ........... | 363/21.16 |
| 6,111,763 A | * | 8/2000 | Hanabusa et al. ........ | 363/21.15 |
| 6,144,566 A | * | 11/2000 | Keller ..................... | 363/21.12 |
| 6,185,111 B1 | | 2/2001 | Yoshida | |
| 6,381,156 B1 | * | 4/2002 | Sakai et al. .................... | 363/65 |

* cited by examiner

*Primary Examiner*—Brian Sircus
*Assistant Examiner*—Sharon A. Polk
(74) *Attorney, Agent, or Firm*—Lanier Ford Shaver & Payne P.C.

(57) ABSTRACT

An apparatus for providing power to electronic equipment having multiple power sources. The separate and distinct power sources drive corresponding primary circuits such that the power source inputs can be of a different nature and the power supply can be designed to accommodate different types of voltage inputs. Each primary circuit is isolated one from the other, such that damage resulting from ground-loop potentials is minimized by circuit isolation. Circuit isolation is accomplished by optical isolation between each primary circuit.

2 Claims, 1 Drawing Sheet

DUAL ISOLATED INPUT POWER SUPPLY

BACKGROUND OF INVENTION

1. Field of the Invention

The present invention relates generally to the field of power supplies and particularly to power supplies capable of switching between mutually exclusive primary circuits for voltage input, thereby allowing the use of multiple and diverse power sources.

2. Technical Background

Electronic equipment is often used in critical applications where the loss of a power source results in significant impact to the user. Power supplies, which are capable of seamlessly switching to a backup power source, help to minimize this impact. For example, in the data communications field, power supplies often provide operational power to electronic equipment employed by emergency communication services, such as 911 services. In the event of failure of the main power source, it is essential that the process of receiving calls and dispatching emergency vehicles remains intact. Reliable electronic equipment powered by redundant and diverse power sources lessens the probability of a complete breakdown of the emergency process. If a blackout occurs and the main power source that drives the electronic equipment is affected, then there is a need for some type of backup power source.

In order to provide redundancy, and hence reliability, provisions are often made in the design of power supplies to support circuit powering from more than one voltage source. For example, a power supply that drives data communications equipment applications sometimes allows the equipment to be powered locally from an available power source, or powered from voltages received over a communications channel. In the event of failure, this type of power supply allows for seamless transition between the local power source and the alternative voltage received over the communication channel.

Power source redundancy can be achieved in electronic equipment by including in the equipment design more than one power supply. This type of design would include two separate and distinct transformers with two separate and distinct voltage sources. An external switch monitoring the primary input of one of the power supply inputs could provide a switching mechanism between the power supplies in the event of a loss of power. In other words, if the currently active power supply is affected, then the switch can activate the alternative supply. However, this type of backup power supply design is expensive, requiring two separate power supplies.

Redundancy is also achieved in the art with switching power supplies. Switching power supplies are generally designed to receive an alternating current (AC) source. A second power source can be used as input, such as a battery. A battery, however, outputs a Direct Current (DC) voltage. Therefore, prior to the use of the backup battery voltage, a DC to AC conversion is required. An example includes electronic equipment having an Uninterruptable Power Supply (UPS). Generally, an UPS functions primarily from local main power. However, if there is a disruption in the current flow (i.e. a blackout), then a battery is used as a backup source of voltage input to the power supply. However, this type of design requires a complicated conversion circuit.

Another solution to the redundancy approach is described in U.S. Pat. No. 5,751,564. The '564 design is a dual input circuit power supply. Generally, the invention includes a transformer having two primary circuits corresponding to two separate and distinct power sources. The switching between the first and second primary circuit is achieved by a switching circuit that monitors the input of the first primary circuit, and switches to the second primary circuit upon a change in the current flow from the first power source. This type of design solution, however, has significant disadvantages. It is prone to ground-loop current, and hence is unreliable. The '564 design and it's lack of voltage isolation between power sources fails to provide adequate protection for the power source provider.

This ground-loop current disadvantage of the power supply disclosed in the '564 design is created by the existence of the two mutually exclusive primary circuits corresponding to each power supply input. When the ground potentials are different between two physically connected circuits, voltage will flow from high potential to low potential. A higher potential in the first primary circuit and a lower potential in the second primary circuit may cause a ground-loop surge. Ground-loop surges caused by the redundant dual circuit can then cause damage to the circuitry of the power supply. Consequently, the power supply is fault prone and unreliable.

The non-isolated topology of the '564 design fails to provide adequate protection to either power source in the event of a power supply component failure. For example, customer premise data communications equipment is powered from local mains power and uses a voltage delivered over the communications channel physical medium for backup power. Adequate. protection is a requirement in order to insure a failure of the remote end equipment does not apply a hazardous or damaging voltage to the service providing central office equipment.

Therefore, what is needed in the industry is an inexpensive dual input power supply that is reliable in light of the threat of damage caused by potential differences between multiple primary circuits and affords adequate protection to the individual power sources. In addition, the transition between the various power sources must be nearly instantaneous and seamless to the user.

SUMMARY OF THE INVENTION

One object of the present invention is to provide a dual input power supply including two mutually exclusive primary circuits. The present invention allows for multiple input sources by including in the transformer circuit multiple primary windings and a single secondary winding. The multiple primary windings correspond to the separate and distinct multiple power sources.

Another object of the present invention is to allow for the primary circuits to function without the threat of ground-loop current damage. The present invention isolates the primary circuits relating to the corresponding power source inputs. This is accomplished by including, in the power supply circuitry, optical isolators positioned such that, if a current is seeking a lower voltage potential, it is unable to travel from primary circuit to primary circuit. Data signals communicated from one primary circuit to another are converted to light pulses by the isolator; however, the optic air gap prohibits ground-loop current from traveling from circuit to circuit. This resultant isolation provides a high degree of protection for the individual power sources.

Another object of the present invention is including, in the power supply, control circuits for each primary circuit in order to allow selection of one primary circuit. In this multiple control circuit approach, each control circuit is connected so that the selection process can be achieved. In order to achieve optical isolation between the primary circuits, optical isolators must be placed in each link connecting the control circuits.

Another object of the present invention is implementing an optical feedback circuit from the output of the power supply. The optical feedback circuit further provides isolation between the primary circuits.

These and additional features and advantages of the invention will be set forth in a detailed description which follows. It is to be understood that both the foregoing general description and the following detailed description are merely exemplary of the invention. The accompanying drawings are included to provide further understanding of the invention and are incorporated in and constitute a part of the specification. The drawings illustrate various embodiments in the invention and, together with the descriptions, serve to explain the principles and operations of the invention.

BRIEF DESCRIPTION OF THE DRAWINGS

An exemplary embodiment of the invention is described in the following text with reference to a schematic circuit diagram, in which.

DETAILED DESCRIPTION OF THE PREFERRED EMBODIMENTS

Figure 1:
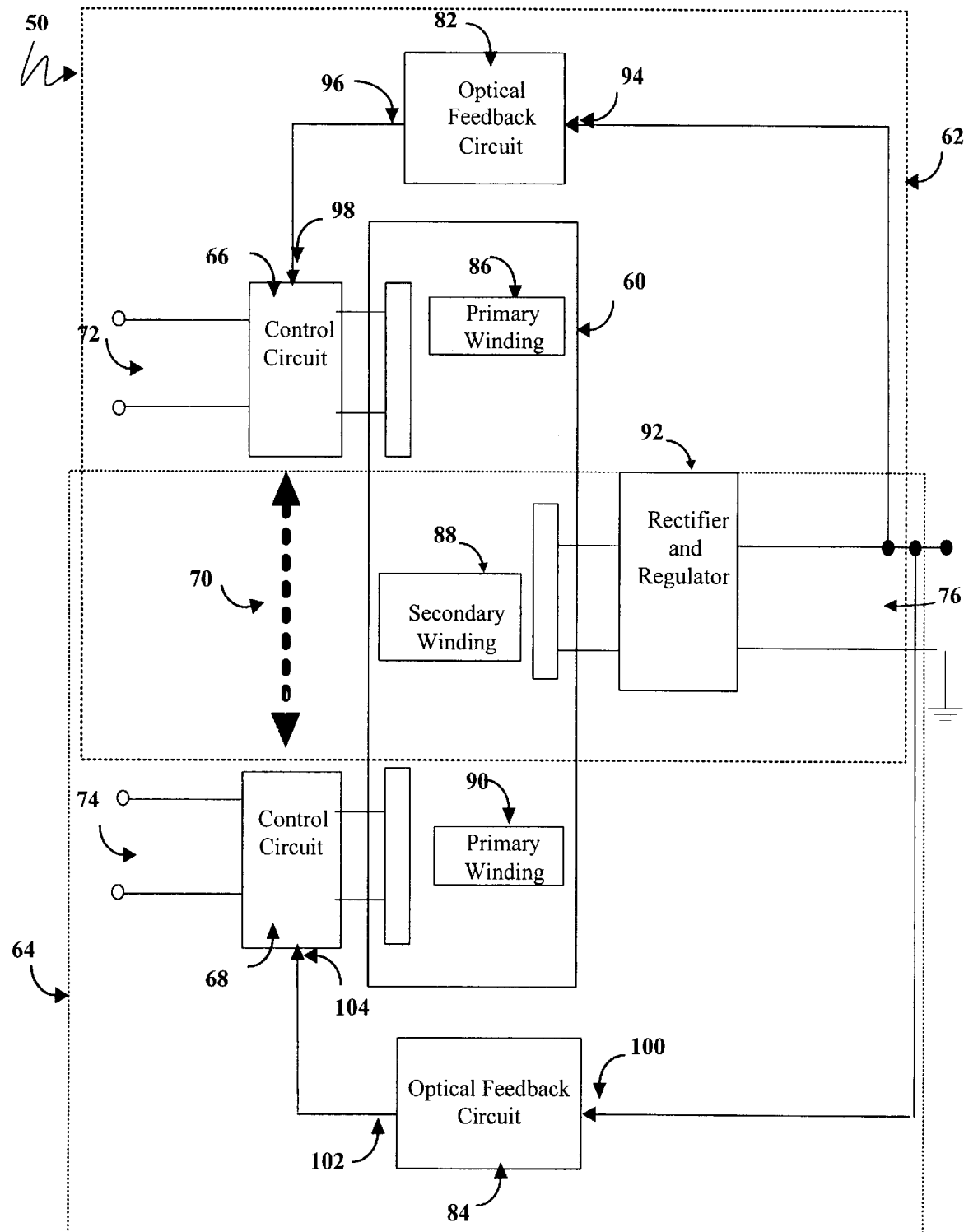
FIG. 1 is a circuit diagram of a preferred embodiment of the power supply of the present invention having optical isolation between two primary circuits.

Reference will now be made in detail to the present preferred embodiment of the invention, an example of which is illustrated in the accompanying drawing. An exemplary embodiment of the dual isolated input power supply of the present invention is shown schematically in FIG. 1, and is designated generally throughout by reference numeral 50.

The power supply 50 includes generally dual inputs 72 and 74, dual control circuits 66 and 68, the transformer circuit 60, and an output 76. The dual inputs 72 and 74 provide dual mutually exclusive power sources to the transformer circuit 60 in accordance with the current state of the control circuits 66 and 68. The power source inputs 72 and 74, may be supplied by, but are not limited to, a local AC main of 90 to 264 volts, a local DC power source at 48 volts, or a DSL communications line at 80 to 200 volts.

The first primary circuit 62 includes the input 72, the control circuit 66, the primary winding 86, the secondary winding 88, the Rectifier and Regulator circuit 92, the output 76, and the optical feedback circuit 82. The first primary circuit 62 serves as a power supply, receiving as input a power source 72 and transforming the signal into a regulated DC output 76.

The second primary circuit 64 also includes a power source input 74, a control circuit 68, a primary winding 90, a secondary winding 88, a Rectifier and Regulator Circuit 92, an output 76, and an optical feedback circuit 84. The second primary circuit 64 serves as an alternative power supply to the first primary circuit when active, receiving input 74 and transforming the signal into a regulated DC output 76.

The first optical feedback circuit 82 receives input 94 from the DC output signal 76. The output signal 96 from the first optical feedback circuit 82 then serves as input 98 to the control circuit 66. The control circuit 66 adjusts the voltage and consequently forces the power supply output to the correct value in accordance with the signal input 98 received from the first optical feedback circuit 82.

The second optical feedback circuit 84 receives input 100 from the DC output signal 76. The output signal 102 from the second optical feedback circuit 84 then serves as input 104 to the control circuit 68. The control circuit 68 adjusts the voltage and consequently forces the power supply output to the correct value in accordance with the signal input 104 received from the second optical feedback circuit 84.

The first control circuit 66 and the second control circuit 68 are connected via an optical link 70. The first control circuit 66 and the second control circuit 68 are electrically connected so that a switching relationship is established between the dual control circuits. The optical link in the connection between the first control circuit 66 and the second control circuit 68 serves to isolate the first primary circuit 62 from the second primary circuit 64.

The switching relationship between the first control circuit 66 and the second control circuit 68 can be established by various ways known in the art. For example, the first circuit 66 may be programmed to be the master circuit in the control circuit relationship. In this scenario, the first control circuit 66 is programmed to inhibit the power source input 74 until some predetermined event. At the occurrence of an event, the control circuit 66 can signal via the optical link connection 70 for the control circuit 68 to allow current flow from the power source 74 into the second primary circuit 64. The predetermined event can include, but is not limited to, a complete interruption in current flow from power source 72, an inhibiting decrease in the current flow from power source 72, or an ineffective output signal 76 received using the input 72.

The present invention is a power supply that is capable of receiving dual inputs. In addition, the power supply of the present invention decreases the probability of power supply failure.

It will be apparent to those skilled in the art that various modifications can be made to the present invention without departing from the spirit and scope of the invention. Thus, it is intended that the present invention covers the modifications and variations of this invention provided they come within the scope of the appended claims and their equivalents.

What is claimed is:

1. A power supply having dual power source inputs, said power supply comprising:

a) a first primary circuit having a first power source input, a first control circuit, and a first primary winding;

b) a second primary circuit having a second power source input, a second control circuit, and a second primary winding, wherein said second control circuit is connected to said first control circuit;

c) a secondary winding;

d) a transformer circuit having a first configuration including the combination of the first primary winding and the secondary winding, and a second configuration including the combination of the second primary winding and the secondary winding;

e) a means for electronically isolating the first primary circuit from the second primary circuit, wherein the means for isolating the first primary circuit from the second primary circuit comprises:

a first optical feedback circuit connecting the DC output to the first control circuit;

a second optical feedback circuit connecting the DC output to the second control circuit; and an optical link between the first control circuit and the second control circuit; and f) a DC output, wherein upon a predetermined event, said first control circuit inhibits current flow from the first power source input and signals the second control circuit to allow current flow from the second power source input to the DC output via the second configuration of the transformer.

2. A dual input power supply for telecommunication applications, said power supply comprising:

a) a transformer having a first primary circuit, a second primary circuit, and a DC output;

b) a first power source input connected to the first primary circuit;

c) a second power source input connected to the second primary circuit;

d) a first control circuit that is positioned to sense the first power source input;

e) a second control circuit positioned to sense the second power source input, said second control circuit connected to said first control circuit; and f) an optical link parallel with and intermediate of the first control circuit and the second control circuit, said optical link providing optical isolation between the first primary circuit and the second primary circuit.

* * * * *